(12) United States Patent
Yang et al.

(10) Patent No.: US 6,545,114 B1
(45) Date of Patent: Apr. 8, 2003

(54) POLYSILOXANEURETHANE-POLY (ACRYLIC ACID)/POLYACRYLATE COPOLYMER AND METHOD FOR MAKING THE SAME

(75) Inventors: Jeng-Cheng Yang, Tao-Yuan (TW); Chen-chi Martin Ma, Hsinchu (TW); Hon-Bin Chen, Tao-Yuan (TW)

(73) Assignee: Chung-Shan Institute of Science & Technology (TW)

( * ) Notice: Subject to any disclaimer, the term of this patent is extended or adjusted under 35 U.S.C. 154(b) by 0 days.

(21) Appl. No.: 09/924,484

(22) Filed: Aug. 9, 2001

(51) Int. Cl.[7] ............................................. C08G 77/04
(52) U.S. Cl. ........................ 528/26; 528/25; 528/44; 528/59; 528/65; 526/279
(58) Field of Search ........................ 528/26, 28, 44, 528/59, 65, 25; 526/279

(56) References Cited

U.S. PATENT DOCUMENTS 4,486,577 A * 12/1984 Mueller et al. ......... 351/160 H
6,169,126 B1 * 1/2001 Szum et la. ................ 522/160

FOREIGN PATENT DOCUMENTS

JP        63256629 A  *  4/1987

* cited by examiner

Primary Examiner—Robert Dawson
Assistant Examiner—Marc S Zimmer
(74) Attorney, Agent, or Firm—Bacon & Thomas, PLLC

(57) ABSTRACT

A polysiloxane-urethane macromonomer having an unsaturated bond on one end thereof was co-polymerized with acrylic acid or acrylate monomers to form a copolymer having polysiloxane-urethane groups as a side chain thereof.

3 Claims, 7 Drawing Sheets

POLYSILOXANEURETHANE-POLY(ACRYLIC ACID)/POLYACRYLATE COPOLYMER AND METHOD FOR MAKING THE SAME

FIELD OF THE INVENTION

The present invention relates to modifications of poly(acrylic acid) or polyacrylate, and in particular to a polysiloxaneurethane-poly(acrylic acid)/polyacrylate copolymer containing polysiloxane-urethane groups as a sidechain of the copolymer.

BACKGROUND OF THE INVENTION

Acrylic resins commonly are designated as synthetic resins formed mainly from acrylic acid or acrylate compoundsl, for examples poly(acrylic acid), polyacrylate, polymethacrylic acid, polymethacrylate, and polyacrylonitrile. Generally speaking, acrylic resins have the following characteristics:

Colorless and transparent;
Capable of being freely colored by a dye;
Good surface glossiness;
Good weather resistance;
Excellent mechanical processability;
Excellent chemical resistance; and
Non-toxic to human body.

Although acrylic resins have the above-mentioned characteristics, their defects, such as brittleness and poor heat resistance, etc., severely limit the applications thereof. Therefore, currently acrylic resins mainly are used in adhesives, coatings, automobile parts, lighting utensils, and general building materials, etc., which have a low unit price, as well as a low value added. If these defects can be improved, the improved acrylic resins will have a broader range of applications, as well as an increased value added for the products made thereof.

SUMMARY OF THE INVENTION

The present invention firstly prepares a polysiloxane having an isocyanate group on the two ends thereof; which is then simultaneously reacts with an end capping compound and an acrylic acid or acrylate compound having a hydroxyl group, so that a macromonomer of polysiloxane-urethane having an unsaturated group of acrylic acid/acrylate compound at one end thereof is formed. An acrylic acid/acrylate monomer is added to the resulting reaction mixture to under free radical polymerization, so as to produce a polysiloxaneurethane-poly(acrylic acid)/acrylate copolymer.

A polysiloxaneurethane-poly(acrylic acid)/acrylate copolymer synthesized according to the present invention has a chemical structure as follows:

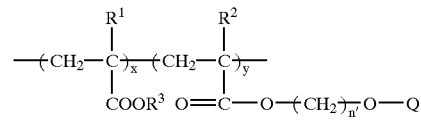

wherein:

$R^1$, $R^2$ and $R^3$ independently are hydrogen or $C_1$–$C_4$ alkyl;

$n'=1–6$; and

Q is $Q^1$ or $Q^2$:

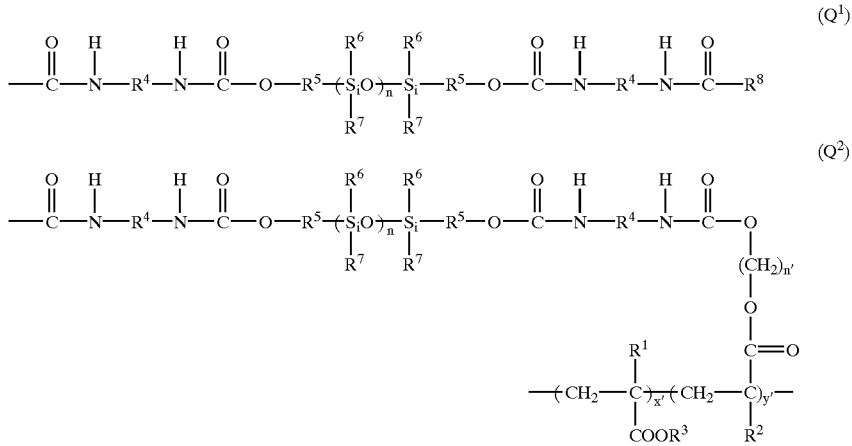

wherein:

$(x+x'):(y+y')=13:1$ to $40:1$;

$R^4$ is

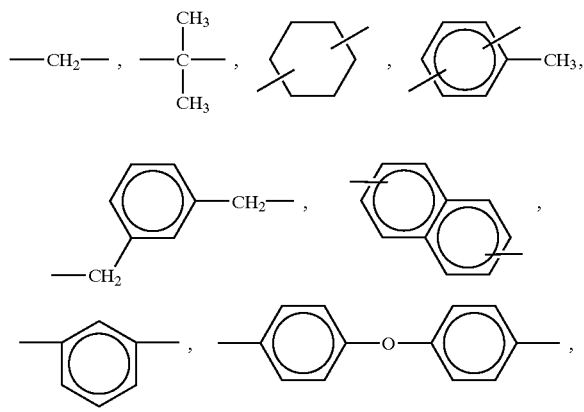

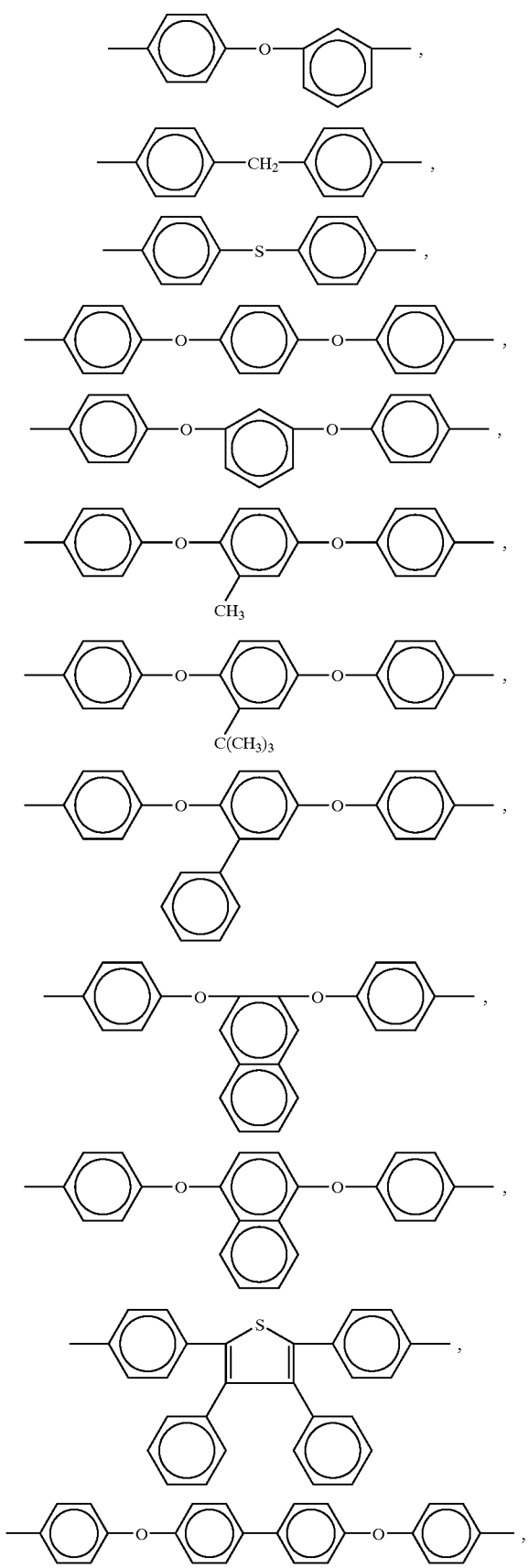

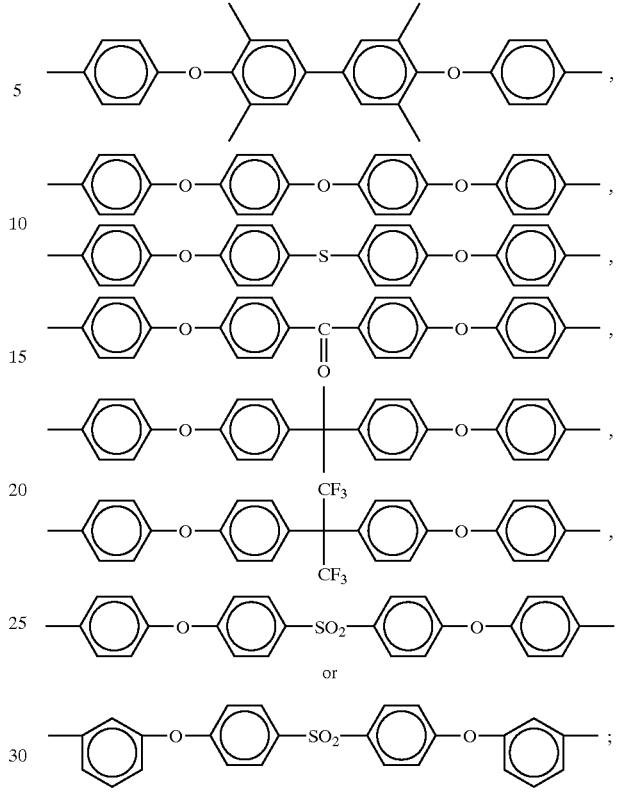

$R^5$ is $C_1$–$C_6$ alkylene;
$R^6$ and $R^7$ independently are $C_1$–$C_4$ alkyl;
$R^8$ is $C_1$–$C_4$ alkoxyl or $C_2$–$C_4$ secondary amine; and
n', $R^1$ and $R^2$ are defined as above.

Preferably, Q in the copolymer at least one Q is $Q^1$ and at least one Q is $Q^2$, and the ratio of $Q^1$ and $Q^2$ enables the copolymer having a swelling ratio of 2–7 after being immersed in tetrahydrofuran for a week.

Preferably, $R^4$ is

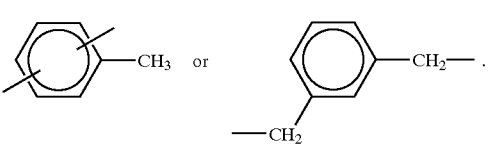

The present invention also discloses a method for preparing the polysiloxaneurethane-poly(acrylic acid)/acrylate copolymer comprising the following steps:
a) reacting a diisocyanate with a polysiloxane having two hydroxyl groups on its two ends at an equivalent ratio of 2:1 to 2.3:1 to prepare a NCO-terminated polysiloxane having each of its two ends terminated with an isocyanate group;
b) simultaneously reacting said NCO-terminated polysiloxane with an endcapping compound and an acrylic acid or acrylate compound containing a hydroxyl group to form a reaction mixture consisting essentially of a polysiloxaneurethane macromonomer having an acrylic acid/acrylate group on one end and a residue of the end-capping compound on the other end; said reaction mixture further comprising a small amount of a macromonomer having an acrylic acid/acrylate group on each of the two ends thereof, wherein the equivalent ratio of said NCO-terminated polysiloxane: said acrylic acid/acrylate compound having a hydroxyl group : said end-capping compound is 1:0.4:0.6 to 1:0.6:0.4; and c) undergoing a free radical copolymerization in said reaction mixture after an acrylic acid/acrylate monomer being added to said reaction mixture.

DETAILED DESCRIPTION OF THE PREFERRED EMBODIMENTS

Figure 1:
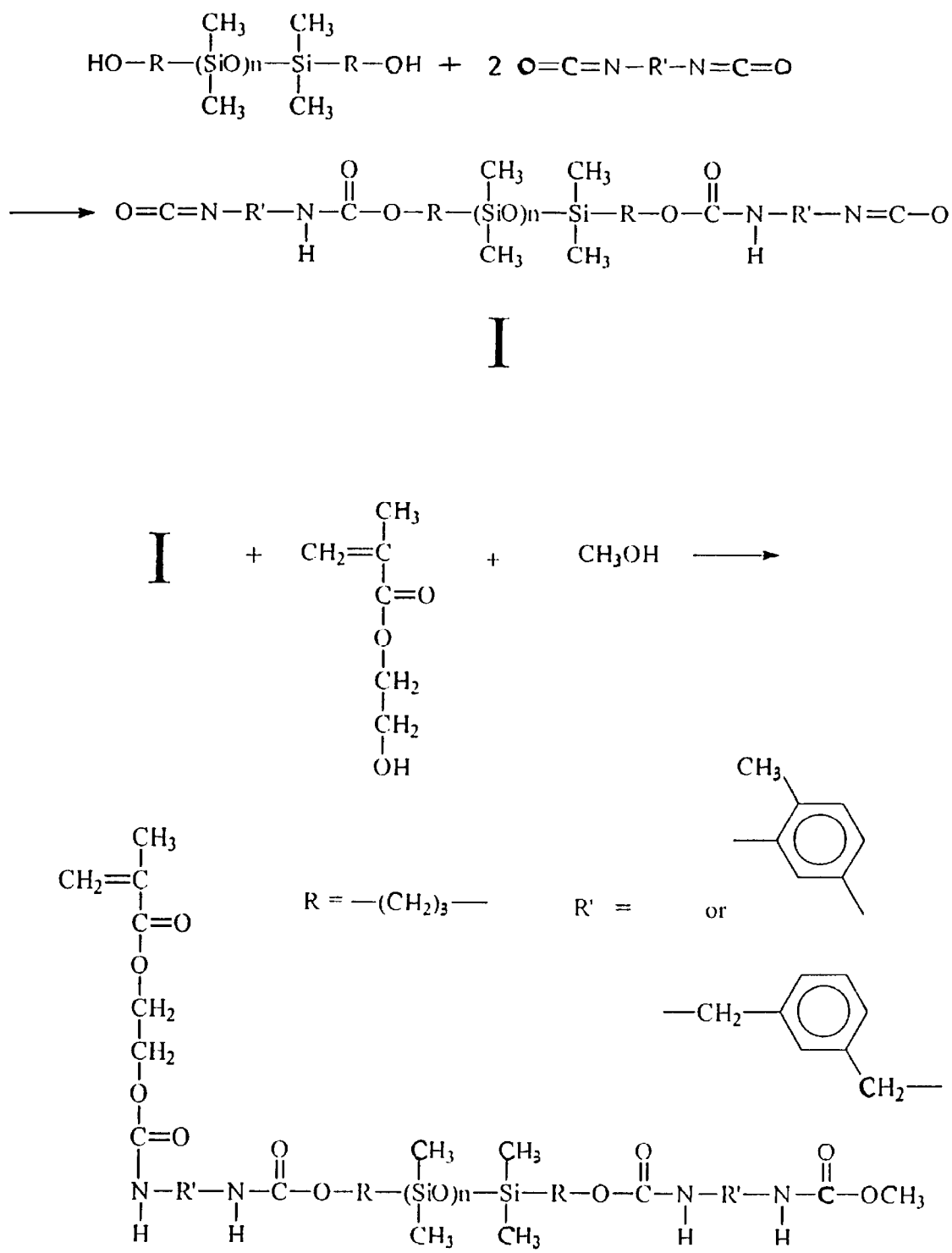
FIG. 1 shows the chemical reaction formula for a polysiloxane-urethane macromonomer having an acrylic acid/acrylate unsaturated group on one end and a residue of an endcapping compound on the other end.

Hereinafter a preferred embodiment of the present invention is disclosed by reacting 2,4-toluene diisocyanate (abbreviated as 2,4-TDI) and m-xylene diiocyanate (abbreviated as m-XDI) with α,ω-bis(hydroxypropyl) poly (dimethylsiloxane) oligomer (abbreviated as PDMS) to form a prepolymer terminated with an isocyanate group. Meanwhile, the prepolymer reacts with 2-hydroxyethyl methacrylate (abbreviated as HEMA) and methanol (as an end capping compound) to form a macromonomer. The related reactions are shown in FIG. 1.

Due to the chemical heterogeneity, it is expected that a small amount of the macromonomer will have an unsaturated double bond on both of its two ends, thereby causing cross-linking between the copolymer backbones during a copolymerization of the macromonomer and methyl methacrylate (abbreviated as MMA).

EXAMPLES

Pretreatment of Reagents

Since a diisocyanate is easy to react with water to form by-products such as carbon dioxide and amines, etc., all moisture-containing reactants should receive a water-removal pretreatment before being used. The related water-removal steps are described briefly in the following:

1. Prior to use, PDMS was de-watered under vacuum in an oil bath at 50° C., and then by using a 4 Å molecular sieve to remove trace water therein. Before being used, PDMS was tested by a Karl Fisher titration to ensure its moisture content being less than 0.05%.

2. MMA and HEMA were distilled under reduced pressure, and then treated by a 4 Å molecular sieve to remove trace water therein. Before being used, MMA and HEMA were tested by a Karl Fisher titration to ensure its moisture content being less than 0.05%.

3. Due to their low moisture content, benzene and anhydrous methanol require no water removal treatment.

Syntheses of Poly(dimethylsiloxane)urethane-methyl methacrylate Macromonomer and Poly (dimethylsiloxaneurethane)-co-poly(methyl methacrylate)

Figure 1A:
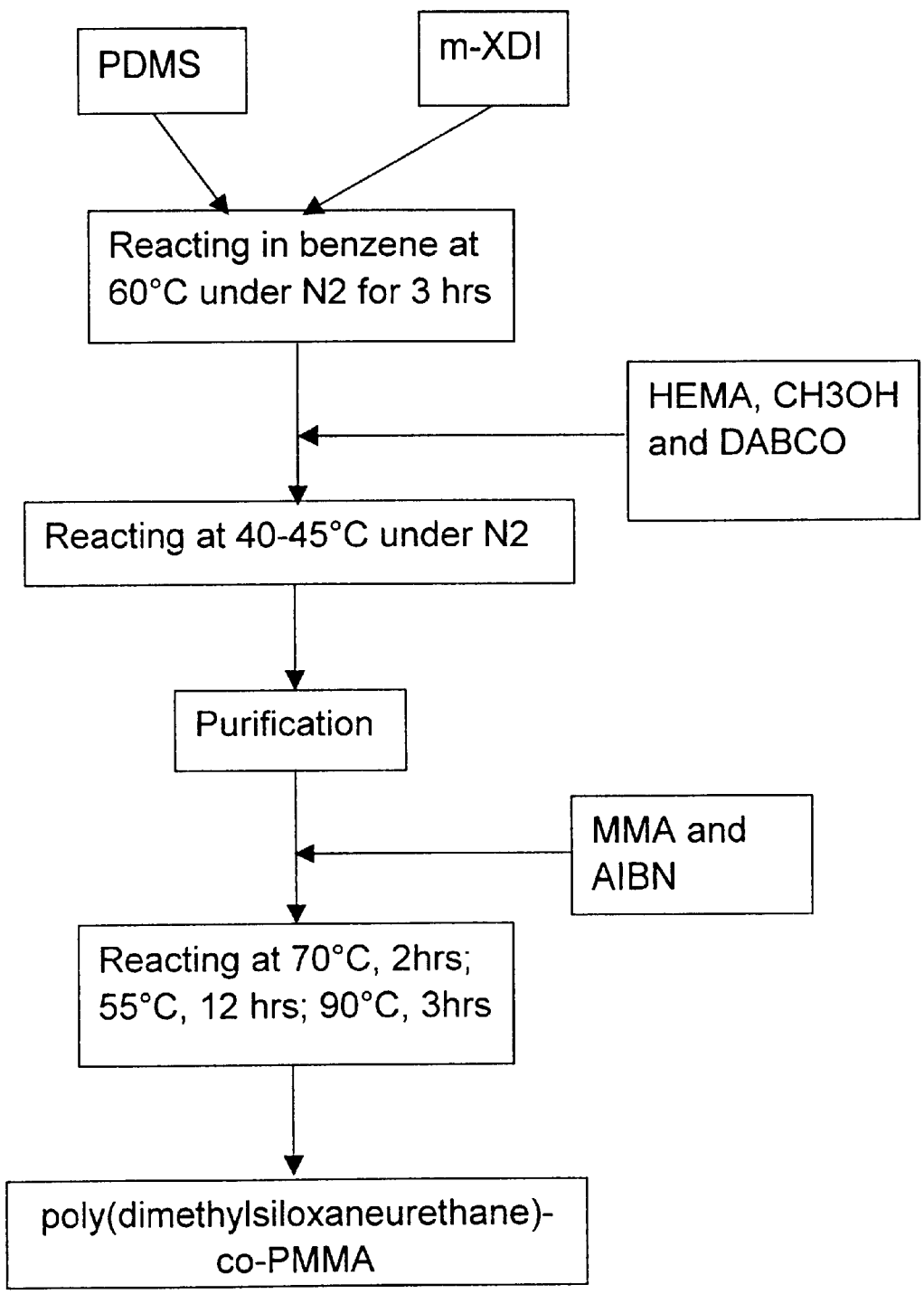
FIG. 1a shows a reaction scheme for the synthesis of polydimethylsiloxaneurethane-co-poly(methyl meththacrylate).

Hereinafter, the two systems of reactions of PDMS with m-XDI and 2,4-TDI are described by using the synthesis of poly(dimethylsiloxane)urethane-methyl methacrylate macromonomer of the m-XDI system. The reaction steps and conditions are the same for the two systems. The reaction scheme is shown in FIG. 1a.

A. Synthesis of Macromonomer (1). Equivalent Ratio of Reagents:

| Item | Name | Equivalent weight (g) | Weight (g) | Equivalent ratio |
|---|---|---|---|---|
| 1 | PDMS | 518.50 | 2.0 | 1.0 |
| 2 | m-XDI | 94.09 | 0.762 | 2.1 |
| 3 | Methanol | 32.04 | 0.0741 | 0.6 |
| 4 | HEMA | | 0.251 | 0.5 |
| 5 | Benzene | | 1.0 | |
| 6 | DABCO* | | 0.005 | |

*1,4-Diazabicyclo(2.2.2.)octane (2). Reaction Steps

1. PDMS, m-XDI and benzene, according to the weight listed in the above table were added into a three-neck round bottomed flask to react in an oil bath at 60° C. for three hours, while nitrogen gas was flowing.

2. Anhydrous methanol, HEMA and DABCO were added, and the reaction was continued. At this time, the reaction temperature was reduced to 40–45° C. A small amount of the reaction mixture was regularly withdrawn therefrom during the reaction, and coated on a KBr salt plate to be measured by an IR tester for the status of the—NCO absorption band (2272 cm$^{-1}$). Upon the disappearance of the—NCO absorption band, the reaction was deemed to be complete and the heating and agitation were terminated.

3. A large amount of tetrahydrofuran (abbreviated as THF) was added into the reaction mixture. To the resulting solution, water was added and stirred for an hour. Thereafter, cyclohexane and active carbon were added to precipitate the macromonomer from the solution. The upper layer solution was decanted. The precipitate was dissolved by THF, and then filtered off the active carbon with a filter paper.

4. The filter cake was washed repetitively with deionized water. The residual solvent was evaporated from the precipitate under vacuum at room temperature.

5. This macromonomer was separately analyzed for its specific functional groups, molecular structure, molecular weight, and distribution of molecular weight by IR, NMR and GPC.

B. Synthesis of Copolymer:

An example is given for the synthesis of poly(dimethylsiloxane)urethane-co-poly(methyl methacrylate) containing 15 wt % of macromonomer based on PMMA; wherein the macromonomer was a m-XDI system. The reaction steps were as follows:

1) 3.08 g macromonomer of the m-XDI system and 20 g of MMA monomer were accurately measured, and placed in a brown reaction bottle in an oil bath at 70° C. When the temperature became stable, 0.06 g of AIBN was added to initiate a free radical polymerization reaction.

2) Two clean glass plates of a suitable size were used to clamp a rectangular silicone gasket, the periphery of which was fastened by clips to form a mold of a test piece.

3) When the reaction had been carried out for two hours, the viscosity of the reaction mixture started to increase. Then the heating and agitation were stopped, and the reaction mixture was cooled to room temperature. The reaction mixture was poured into the glass mold formed in step 2), and placed in an oven at 55° C. for 12 hours for hardening, followed by at 90° C. for three hours. A molded test piece was removed from the mold after being cooled to room temperature.

The procedures were repeated to synthesize copolymers by using different amounts of the macromonomer and a different macromonomer of 2,4-TDI system. For ease of reference, each test piece for was given a different name according to the following rules. For example, the name of the test piece prepared above is SiX2.5, in which:

Si=PDMS;

X=m-XDI; abbreviated as T for 2,4-TDI;

2.5=the content of the macromonomer in the copolymer is 2.5% (w/w) of the MMA used, abbreviated as 5 if the content is 5%.

Accordingly, a test piece of poly(dimethylsiloxaneurethane)-co-poly(methyl methacrylate) containing 15% (w/w) of a macromonomer of 2,4-TDI system, based on the weight of MMA, is named as SiT15. Furthermore, the macromonomers synthesized from 2,4-TDI and m-XDI are abbreviated as PRETDI and PREXDI, respectively.

Figure 2:
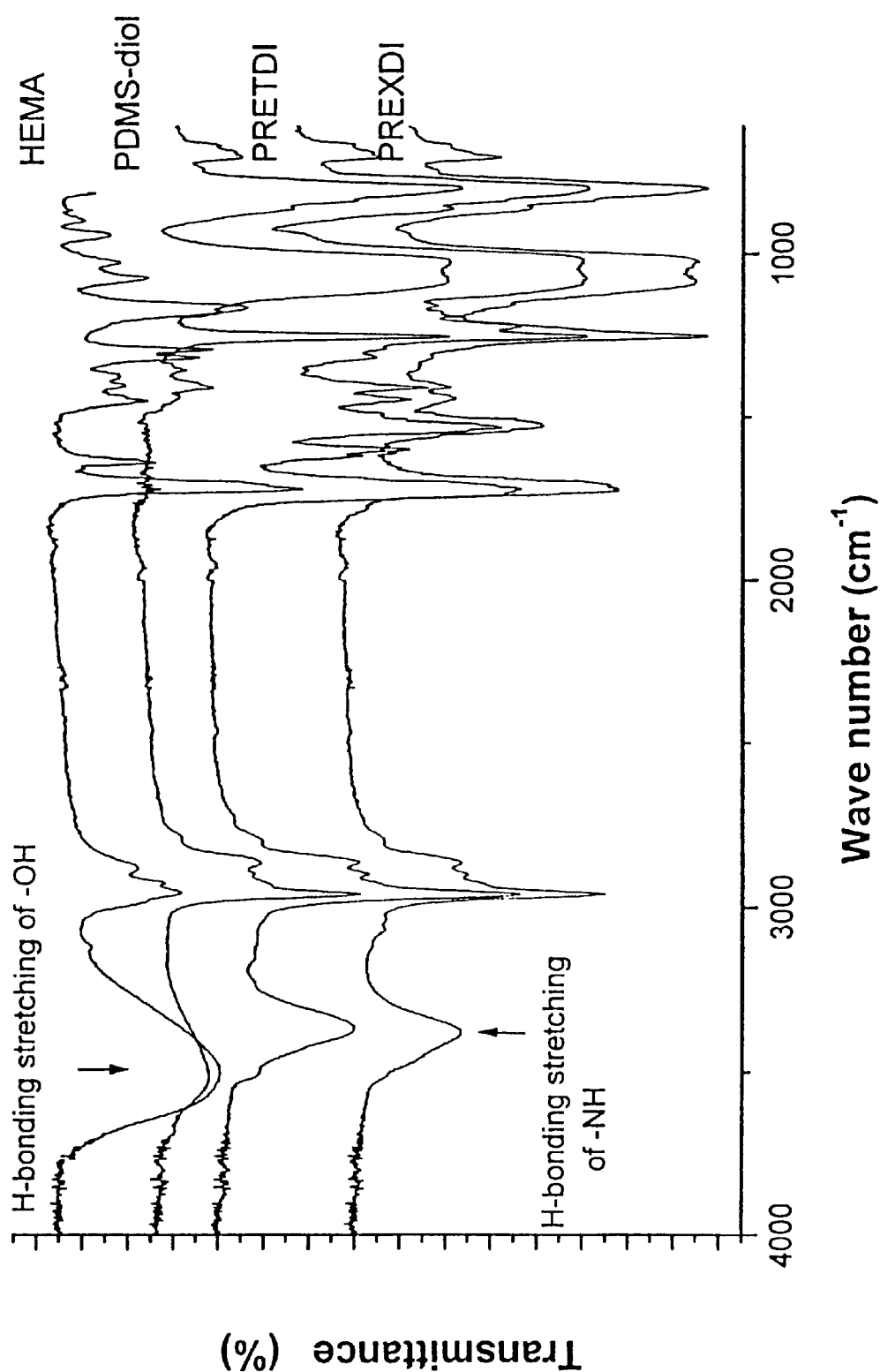
FIG. 2 shows IR spectra of 2-hydroxyethyl methacrylate (HEMA), α,ω-bis (hydroxypropyl) poly(dimethylsiloxane) oligomer (PDMS), a macromonomer synthesized from 2,4-TDI (PRETDI), and a macromonomer synthesized from m-XDI (PREXDI).

IR spectra for HEMA, PDMS, PRETDI and PREXDI are shown in FIG. 2, from which it can be seen that the hydroxy groups of HEMA and PDMS-diol disappear in the spectra of PRETDI and PREXDI. Instead, a H-bonding stretching of—NH stretching absorption band of the urethane group shows up. Moreover, the characteristic absorption peak (~2270 cm$^{-1}$) of the diisocyanate group in 2,4-TDI and XDI of the reactants also disappear in the IR absorption spectra of the PRETDI and PREXDI products. Therefore, it was determined that the diisocyanate groups and the hydroxy groups in the reactants reacted and formed urethane groups. Moreover, the hydrogen atom absorption of C=C double bond of the macromonomer (5.58, 6.13 ppm) and the hydrogen atom absorption on the secondary amine of the urethane group (2,4-TDI system: 6.728 and 7.757 ppm; m-XDI system: 5.123 ppm) were observed in H$^1$-NMR spectra. The molecular weight of the macromonomers measured by H$^1$-NMR and GPC are shown in Table 1. The value in the parenthesis shown in the table is a theoretical molecular weight. The results of the measurements indicate that the measured molecular weight of a synthesized product is close to a theoretical value thereof. It can be concluded from the above-mentioned results that the desired siloxane macromonomers of the 2,4-TDI system and the m-XDI system have been successfully synthesized.

TABLE 1

| Measuring Method | PRETDI | | PREXDI | |
|---|---|---|---|---|
| | GPC | NMR | GPC | NMR |
| Mn | 1593 | 1602 (1547)* | 1776 | 1686.5 (1575)* |
| Mw | 1768 | — | 2300 | — |
| PDI | 1.4685 | — | 1.2951 | — |
| | SiT3.75 | SiT22.5 | SiX3.75 | SiX22.5 |
| Swelling Ratio | 4.157 | 3.268 | 5.883 | 3.721 |
| Content of soluble components (wt %) | 1.74 | 1.21 | 1.89 | 1.42 |

*(): theoretical value

Figure 3:
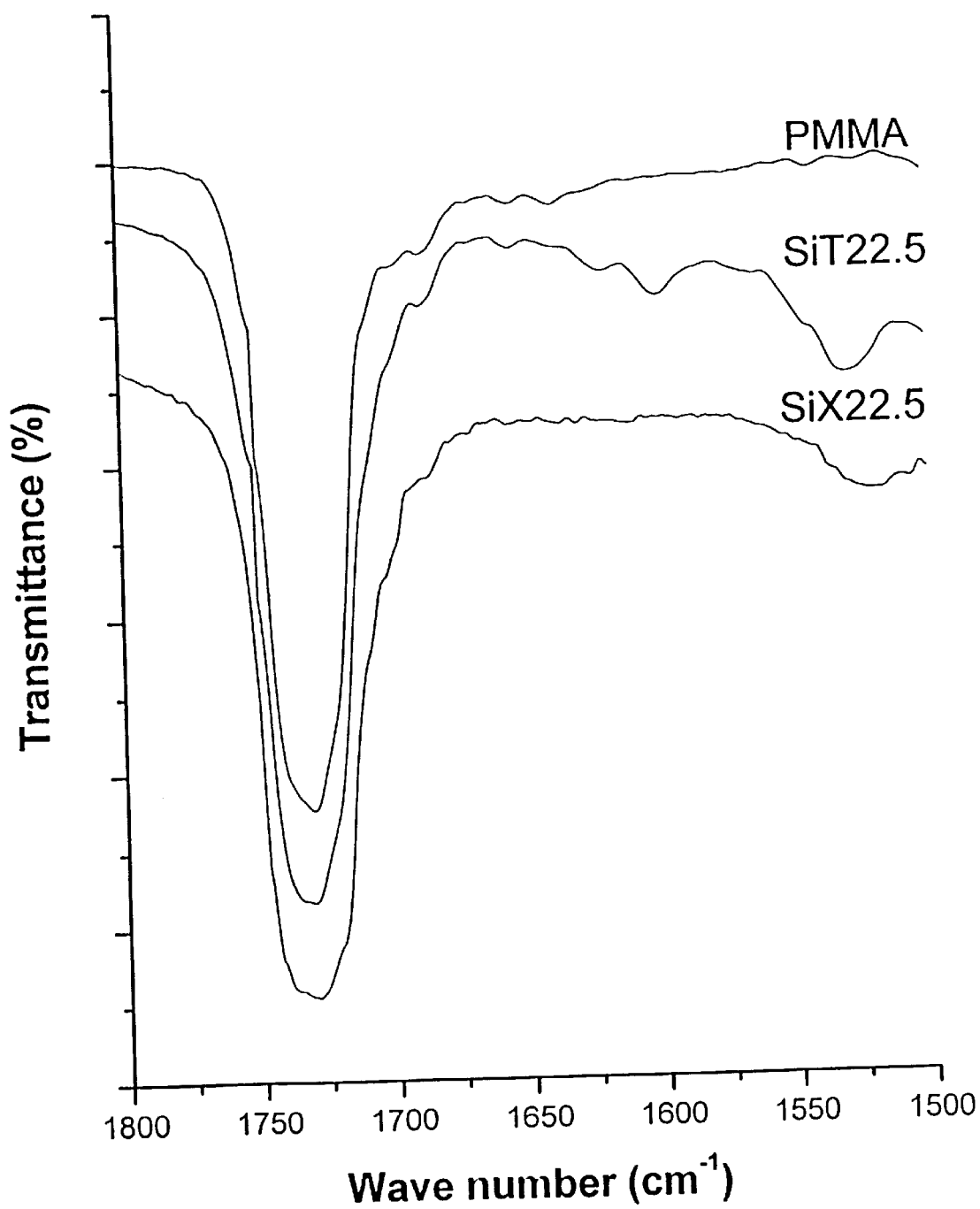
FIG. 3 shows IR spectra for poly(methyl methacrylate) (PMMA), and copolymers containing 22.5 phr (per hundred parts by weight of methyl methacrylate (MMA)) of 2,4-TDI and m-XDI macromonomers, respectively (abbreviated as SiT22.5 and SiX22.5, respectively).

Regarding the synthesis of the copolymer, methyl methacrylate has a strong C=C double bond stretching absorption near 1650 cm$^{-1}$. Therefore, the completion of a reaction between MMA and the macromonomer can be determined by observing whether or not the reaction mixture has an absorption near this wavelength. FIG. 3 shows the IR spectra of PMMA, and the copolymers of 2,4-TDI system and m-XDI system macromonomers, both containing 22.5 phr (per 100 parts by weight of MMA used), and abbreviated as SiT22.5 and SiX22.5, respectively. The spectra clearly indicate that the copolymers have no absorption near the wavelength of C=C double bond stretching absorption. Therefore, it can be determined that MMA and the macromonomer have reacted completely. Even though the equivalent ratio of HEMA, PDMS, methanol and diisocyanate is 1:2:1:4, i.e. theoretically the macromonomer will contain only one unsaturated double bond at one end thereof, a small amount of the macromonomer will contain two unsaturated double bonds on the two ends thereof due to the heterogeneity of the reaction (e.g. agitation, non-uniform distribution in temperature, and impurities, etc.), which will cause cross-linking during the synthesis of the co-polymer, so that the copolymer forms a net-work structure. In order to understand the degree of cross-linking in the copolymer, usually a swelling measurement is carried out. Its procedures comprise immersing the copolymer in a good solvent for a certain period of time (usually one week), and measuring the variation in volume or density of the copolymer prior to and after the immersion. A larger volume expansion (smaller density) after immersion indicates a lower degree of cross-linking. Table 1 exemplifies the swelling ratio (volume expansion0 after an immersion of test pieces of SiT3.75, SiX3.75, SiT22.5 and SiX22.5 in THF at room temperature for a week. The results in Table 1 indicate that the content of the macromonomer in the copolymer is inversely proportional to the swelling ratio, i.e. is proportional to the degree of cross-linking. The last row in Table 1 indicates the content of soluble portion after the copolymer has been repetitively extracted with a soxhlet cyclic washing device for three days using THF as the solvent. The soluble portion in the copolymer include copolymers which is not cross-linked, PMMA homopolymers, and unreacted macromonomers, etc. The results indicate that the content of the soluble portion in the copolymer is less than 2 wt %.

Figure 4:
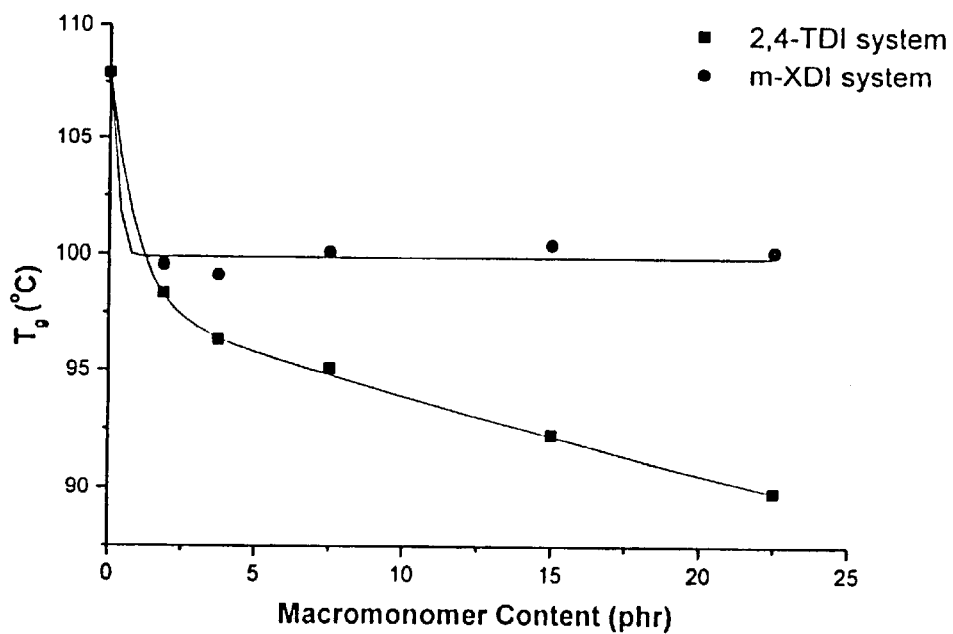
FIG. 4 shows the relationship between the macromonomer content of the copolymers of the present invention and the glass transition temperature (Tg) measured by a Differential Scanning Calorimetry (DSC), wherein the black dot represents the m-XDI system and the black square represents the 2,4-TDI system.
Figure 5:
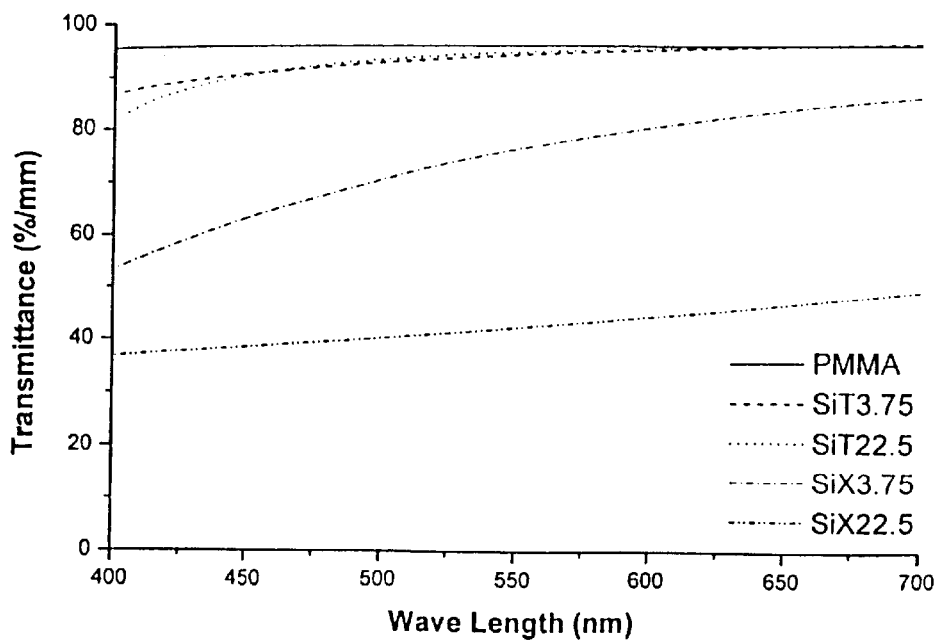
FIG. 5 shows the transmittance of the visible light for PMMA and the copolymers of the present invention.

In 2,4-TDI system copolymers, the results of the DSC measurement as shown in FIG. 4 indicate that Tg of the 2,4-TDI system copolymers decreases along with an increase in the content of macromonomer, i.e. an increase in the content of the side-chain poly(dimethylsiloxane) urethane in the copolymers. The 2,4-TDI system copolymers also show a good transparency as shown in FIG. 5, wherein the 2,4-TDI system copolymers have a high transparency to the visible light. These results indicate that PMMA and PDMS are miscible to each other and form a homogeneous phase. Therefore, the test piece has a good transmittance and a weak absorption to the visible light. The test results of DSC and the visible light spectrum indicate that the PMMA main chains and the sidechain poly(dimethylsiloxane) urethane having a low Tg in the 2,4-TDI system copolymers have a good compatibility to each other, so that the copolymers have a homogeneous single phase. Therefore, the copolymers have a good transparency. Furthermore, an increase in the content of the side-chain poly (dimethylsiloxane)urethane in the copolymers will lower the Tg of the copolymers.

It can be seen from FIG. 5 that the m-XDI system copolymers (SiX3.75 and SiX22.5) have a low transmittance within the range of the visible light. The appearances of the test pieces show a white and semi-transparent outlook. This indicates that the a diffraction of the incident light occurs while passing through a test piece of a m-XDI system copolymer. In other words, PMMA and PDMS are not compatible to each other, and undergo a phase separation. The side-chain poly(dimethylsiloxane)urethane coagulate with each other to form microdomains dispersed in the PMMA, thereby causing a diffraction of the incident visible light and reducing the intensity of the light transmitted. When the side-chain poly(dimethylsiloxane)urethane in the copolymer increases, the light transmittance decreases as well as an increase in the degree of diffraction, indicating a more serious phase separation. Furthermore, the DSC measurements in FIG. 4 show that Tg of m-XDI system copolymers does not vary along with a change in the content of the macromonomer.

Figure 6:
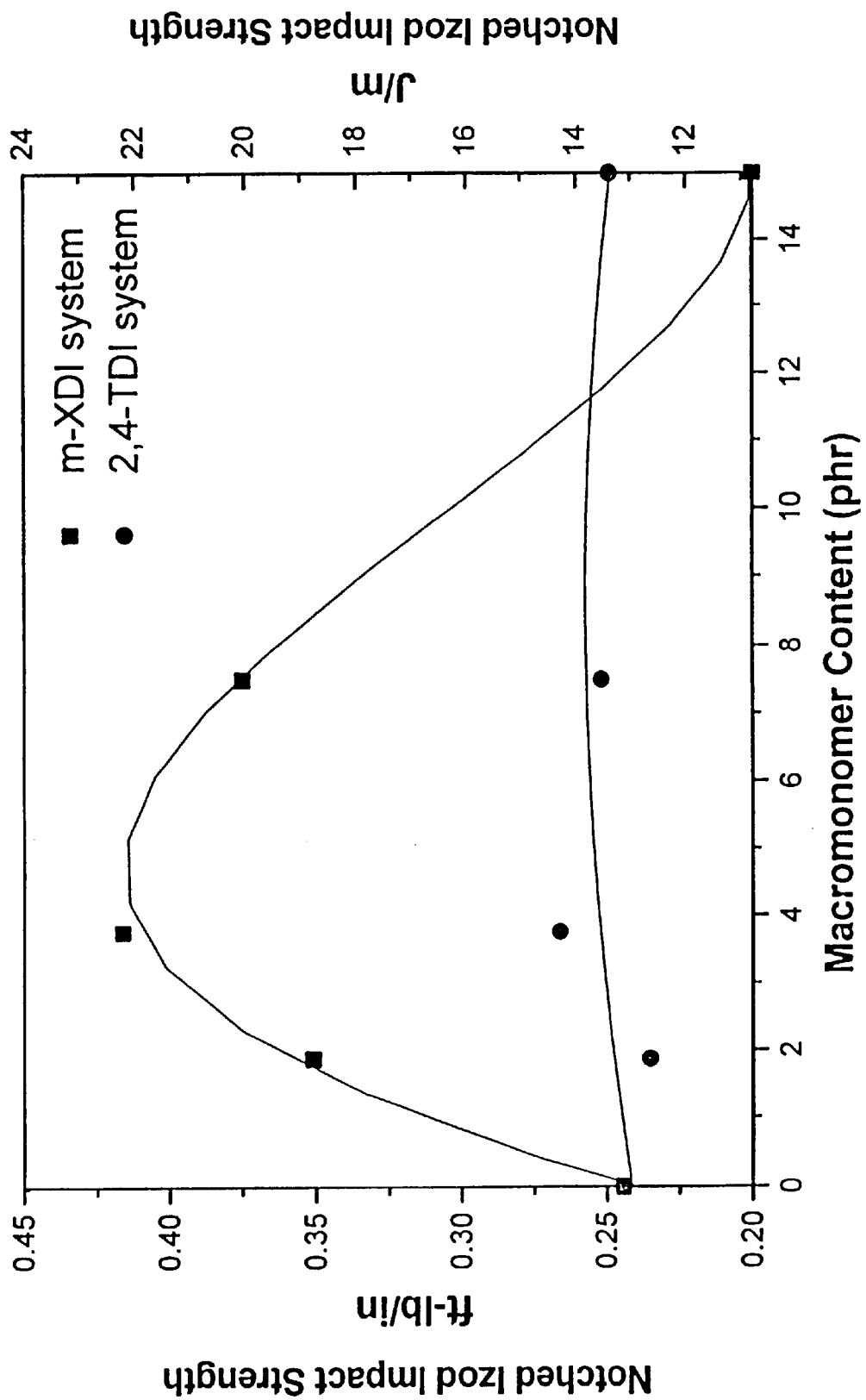
FIG. 6 shows the notched Izod impact strength of the 2,4-TDI system and m-XDI system copolymers of the present invention according to ASTM D-256, wherein the black dot represents the 2,4-TDI system and the black square represents the m-XDI system.

FIG. 6 shows the impact strength of the copolymers of the 2,4-TDI system and the m-XDI system according to the notched Izod impact test of ASTM D-256. The curve indicates that the impact strength of m-XDI system copolymers reaches a maximum of 0.416 ft-lb/in (22.21 J/m), when the macromonomer content reaches 3.75 phr, which is an increase of nearly 70% compared to the impact strength of 0.244 ft-1 b/in (13.02 J/m) of pure PMMA. The impact strength of the m-XDI system copolymer [0.2 ft-1 b/in (10.68 J/m)] is slightly lower than that of pure PMMA, when the macromonomer content reaches 15 phr. Meanwhile, the macromonomer content of 2,4-TDI system copolymers is nearly independent of the impact strength of the copolymers, which is close to the impact strength of pure PMMA.

Figure 7:
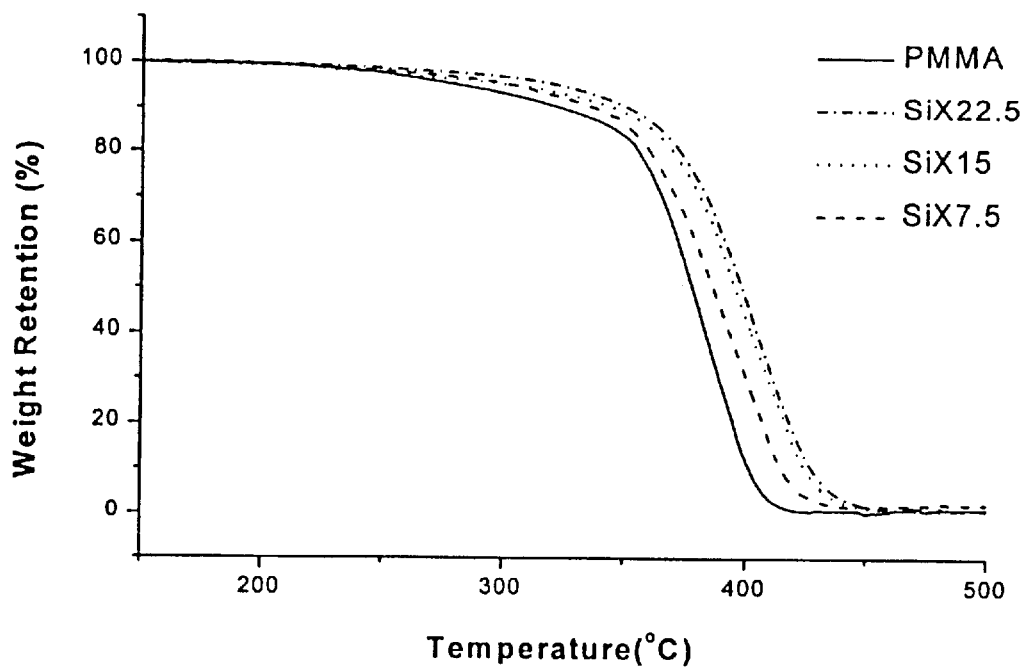
FIG. 7 shows the results of the thermogravimetric analysis (TGA) in a nitrogen environment for m-XDI system copolymers having various macromonomer contents.
Figure 8:
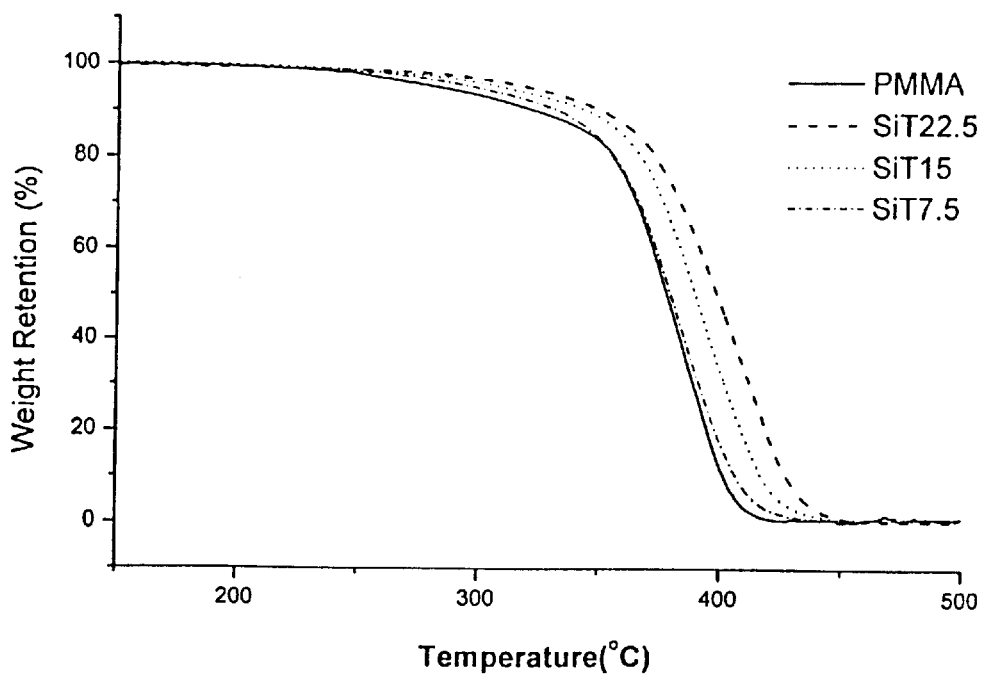
FIG. 8 shows the results of the thermogravimetric analysis (TGA) in a nitrogen environment for 2,4-TDI system copolymers having various macromonomer content.

FIG. 7 and FIG. 8 separately are the TGA results of the 2,4-TDI system and m-XDI system copolymers having different macromonomer contents in a nitrogen environment (the TGA measurement conditions: nitrogen atmosphere, rate of heating 10° C./minute). It can be seen from FIGS. 7 and 8 that, regardless of a 2,4-TDI system copolymer or a m-XDI system copolymer, the pyrolysis curve of a copolymer shifts towards a higher temperature along with an increase in the macromonomer content. This indicates that the heat resistance of the copolymers increase along with an increase in the macromonomer content thereof. The temperatures of 5% and 10% loss in weight for PMMA, 2,4-TDI and m-XDI system copolymers are shown in Table 2. The data in Table 2 indicate that the temperatures of 5% and 10% loss in weight for 2,4-TDI or m-XDI system copolymers with a same macromonomer content are very similar, and are all higher than that of a PMMA homopolymer. Take a macromonomer content of 22.5 phr as an example, the temperatures of 5% loss in weight for SiT22.5 and SiX22.5 are both nearly 80° C. higher than that of a PMMA homopolymer, and nearly 30° C. higher for 10% loss in weight.

TABLE 2

|  | PMMA | SiT7.5 | SiT15 | SiT22.5 |
| --- | --- | --- | --- | --- |
| 5% loss in weight, ° C. | 238 | 298 | 310.5 | 321 |
| 10% loss in weight, ° C. | 323 | 333 | 344.5 | 351 |
|  | | SiX7.5 | SiX15 | SiX22.5 |
| 5% loss in weight, ° C. | | 304.5 | 306 | 324 |
| 10% loss in weight, ° C. | | 337.5 | 345 | 351 |

Table 3 shows the test results of wearing and flame retardance properties for 2,4-TDI system and m-XDI system copolymers. The wearing test was carried out according to ASTM D4060 under test conditions: type of wheel CS-17; rotation speed 60 rpm; and load 1 kg. The data in Table 3 show that the wearing resistance properties for a copolymer is better than that of a PMMA homopolymer. The weight loss and the wear index of the copolymers decrease along with an increase in the macromonomer content. Since the PDMS in the copolymer has a low surface energy and a low friction coefficient, the copolymers have a better wear resistance compared to pure PMMA.

The flame retardance property in Table 3 was obtained according to ASTM D-2863. The copolymers have a limiting oxygen index (L.O.I.) which is slightly higher than that of PMMA. Although the L.O.I. of a copolymer does not vary along with an increase in the macromonomer content, the time required to ignite a test piece increases along with an increase in the macromonomer content during the actual test procedures.

TABLE 3

| | Wear Test | | |
| --- | --- | --- | --- |
| | Loss in weight (mg 1500 cycles) | Wear index (mg/cycle) | L.O.I. |
| PMMA | 5.6 | $11.2 \times 10^{-3}$ | 17 |
| SiX7.5 | 3.8 | $7.6 \times 10^{-3}$ | 18 |
| SiX15 | 2.1 | $4.2 \times 10^{-3}$ | 18 |
| SiT7.5 | 2.3 | $4.6 \times 10^{-3}$ | 18 |
| SiT15 | 1.9 | $3.8 \times 10^{-3}$ | 18 |

What is claimed is:

1. A copolymer of polysiloxaneurethane-poly(acrylic acids)/polyacrylate comprising a structure represented by the following formula:

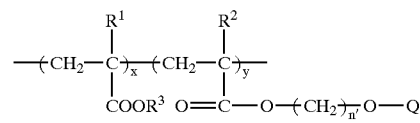

wherein:

$R^1$, $R^2$ and $R^3$ independently are hydrogen or $C_1$–$C_4$ alkyl;

n'=1–6; and

Q is $Q^1$ or $Q^2$:

Q is $Q^1$ or $Q^2$:
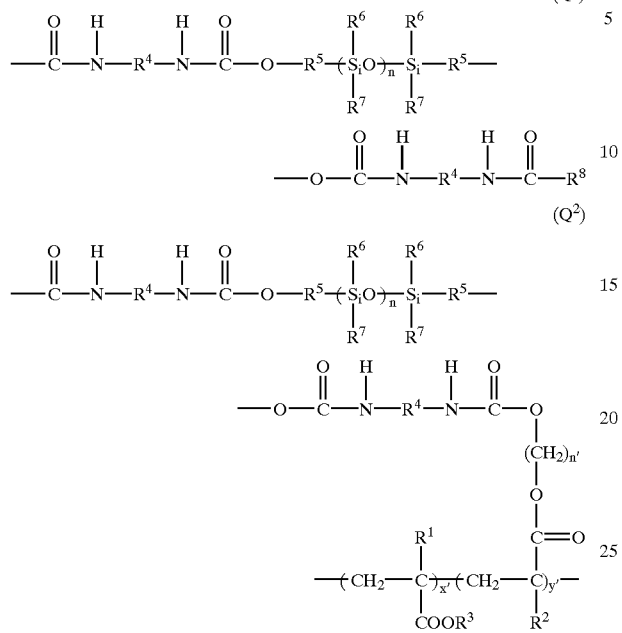
wherein:
$(x+x'):(y+y')=13:1$ to $40:1$;
$R^4$ is
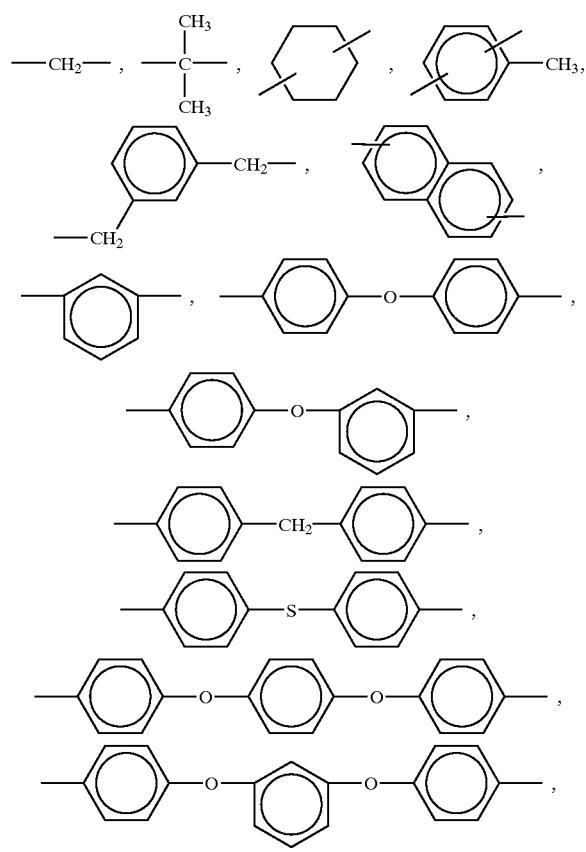
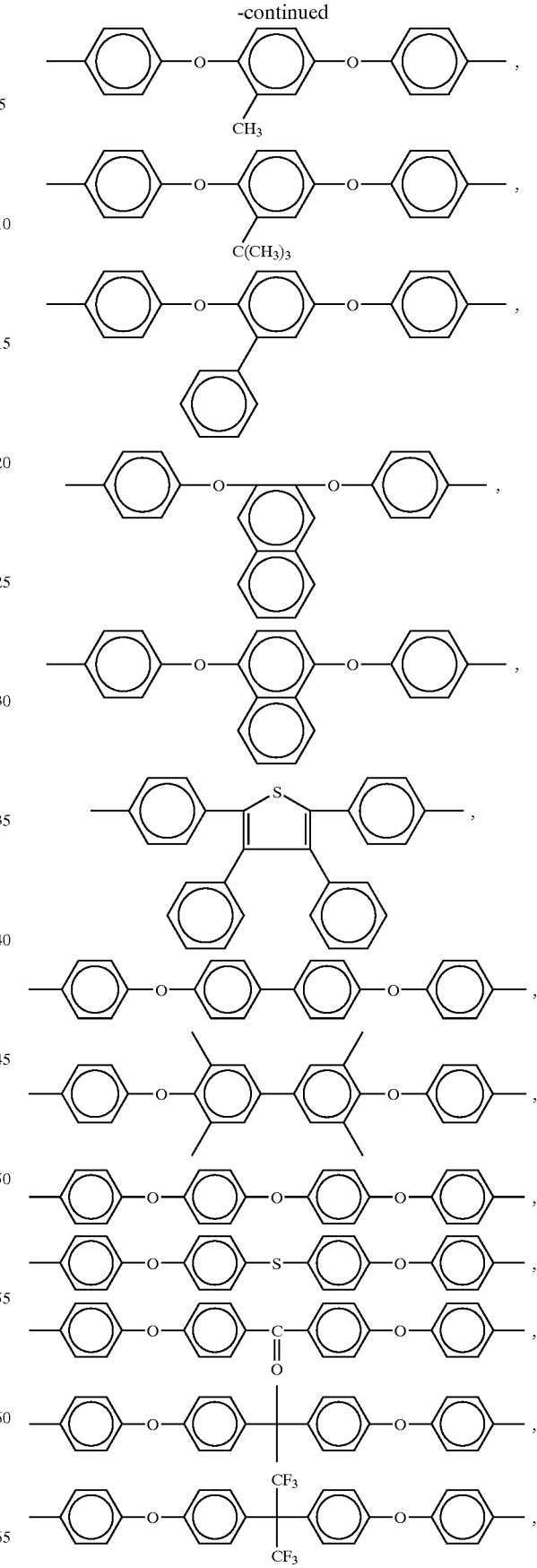

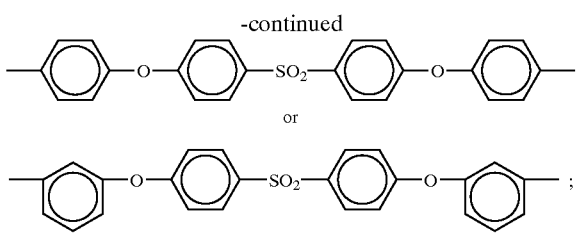

$R^5$ is $C_1$–$C_6$ alkylene;
$R^6$ and $R^7$ independently are $C_1$–$C_4$ alkyl;
$R^8$ is $C_1$–$C_4$ alkoxyl or $C_2$–$C_4$ secondary amine; and
n', $R^1$ and $R^2$ are defined as above; wherein at least one Q is $Q^1$ and at least one Q is $Q^2$, and the ratio of $Q^1$ and $Q^2$ enables the copolymer having a swelling ratio of 2–7 after being immersed in tetrahydrofuran for a week.

2. The copolymer as claimed in claim 1, wherein $R^4$ is

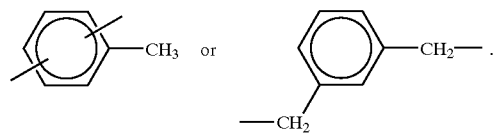

3. A method for preparing a copolymer of claim 1, which comprises the following steps:
  a) reacting a diisocyanate with a polysiloxane having two hydroxyl groups on its two ends at an equivalent ratio of 2:1 to 2.3:1 to prepare a NCO-terminated polysitoxane having each of its two ends terminated with an isocyanate group;
  b) simultaneously reacting said NCO-terminated polysiloxane with an endcapping compound and an acrylic acid or acrylate compound containing a hydroxyl group to form a reaction mixture consisting essentially of a polysiloxane-urethane macromonomer having an acrylic acid/acrylate group on one end and a residue of the end-capping compound on the other end; said reaction mixture further comprising a small amount of a macromonomer having an acrylic acid/acrylate group on each of the two ends thereof, wherein the equivalent ratio of said NCO-terminated polysiloxane: said acrylic acid/acrylate compound having a hydroxyl group: said end-capping compound is 1:0.4:0.6 to 1:0.6:0.4; and
  c) undergoing a free radical copolymerization in said reaction mixture after an acrylic acid/acrylate monomer being added to said reaction mixture.

\* \* \* \* \*